US012518508B2

(12) United States Patent
Case et al.

(10) Patent No.: US 12,518,508 B2
(45) Date of Patent: Jan. 6, 2026

(54) SYSTEMS AND METHODS FOR CHARACTERISTIC CLASSIFICATION AND OBJECT TYPE CLASSIFICATION USING HYPER-TRAINED SUITES OF MACHINE LEARNING MODELS

(71) Applicant: The MITRE Corporation, McLean, VA (US)

(72) Inventors: Robert A. Case, McLean, VA (US); Monica P. Carley-Spencer, McLean, VA (US); Nirupama Bhattacharya, McLean, VA (US); Dasith A. Gunawardhana, McLean, VA (US); Siva P. Raparla, McLean, VA (US); Mark V. Giglio, McLean, VA (US); Michelle M. Brennan, McLean, VA (US); Eric R. Hughes, McLean, VA (US); Richard W. Huzil, McLean, VA (US)

(73) Assignee: The MITRE Corporation, McLean, VA (US)

( * ) Notice: Subject to any disclaimer, the term of this patent is extended or adjusted under 35 U.S.C. 154(b) by 373 days.

(21) Appl. No.: 18/119,149

(22) Filed: Mar. 8, 2023

(65) Prior Publication Data
US 2023/0290117 A1    Sep. 14, 2023

Related U.S. Application Data

(60) Provisional application No. 63/318,235, filed on Mar. 9, 2022.

(51) Int. Cl.
*G06V 10/764*    (2022.01)
(52) U.S. Cl.
CPC ........ *G06V 10/764* (2022.01); *G06V 2201/07* (2022.01)

(58) Field of Classification Search
CPC .......................... G06V 10/764; G06V 2201/07
See application file for complete search history.

(56) References Cited

U.S. PATENT DOCUMENTS 7,706,603 B2    4/2010  Najafi et al.
8,498,491 B1 *  7/2013  Steffens ............... G06V 40/172
                                          382/224

(Continued)

OTHER PUBLICATIONS

Dai et al. "Ensemble Projection for Semi-supervised Image Classification," IEEE International Conference on Computer Vision, Dec. 1-8, 2013, Sydney, Australia; pp. 2072-2079.

(Continued)

*Primary Examiner* — David F Dunphy
(74) *Attorney, Agent, or Firm* — Morrison & Foerster LLP

(57) ABSTRACT

Described herein are systems and methods for generating multi-class machine learning classifiers using a plurality of hyper-trained binary classifiers to perform both characteristic detection and object type classification. A range associated with a characteristic of the data sought to be classified may be divided into a plurality of sub-ranges that can be ordered. A plurality of binary machine learning classifiers can be generated, with each binary classifier associated with one of the sub-ranges. Each binary classifier of the plurality of classifiers may be generated by training the classifier to determine if a given input data set contains a characteristic within or outside of the sub-range associated with the binary classifier. Once the binary classifiers have been trained, they can be used to determine what value within the range of the characteristic an input data sample has, and may be used to determine other properties about the input data.

27 Claims, 11 Drawing Sheets

(56) References Cited

U.S. PATENT DOCUMENTS 9,576,262 B2    2/2017    Ganguly et al.
2020/0372307 A1    11/2020    Arun et al.

OTHER PUBLICATIONS

Han et al. (Jan. 2020). "An ensemble machine learning approach for prediction and optimization of modulus of elasticity of recycled aggregate concrete," Construction and Building Materials 244(2020): 11 pages.
Mustafa et al. (Oct. 2020). "Deep Ensembles for Low-Data Transfer Learning," 20 pages.
O'Donncha et al. (Mar. 2020). "Ensemble model aggregation using a computationally lightweight machine-learning model to forecast oceanwaves," Journal of Marine Systems 199 (103206): 30 pages.
Wang et al. "Model Recommendation: Generating Object Detectors from Few Samples," IEEE Conference on Computer Vision and Pattern Recognition (CVPR), Jun. 7-12, 2015, Boston, MA, USA; pp. 1619-1628.

* cited by examiner

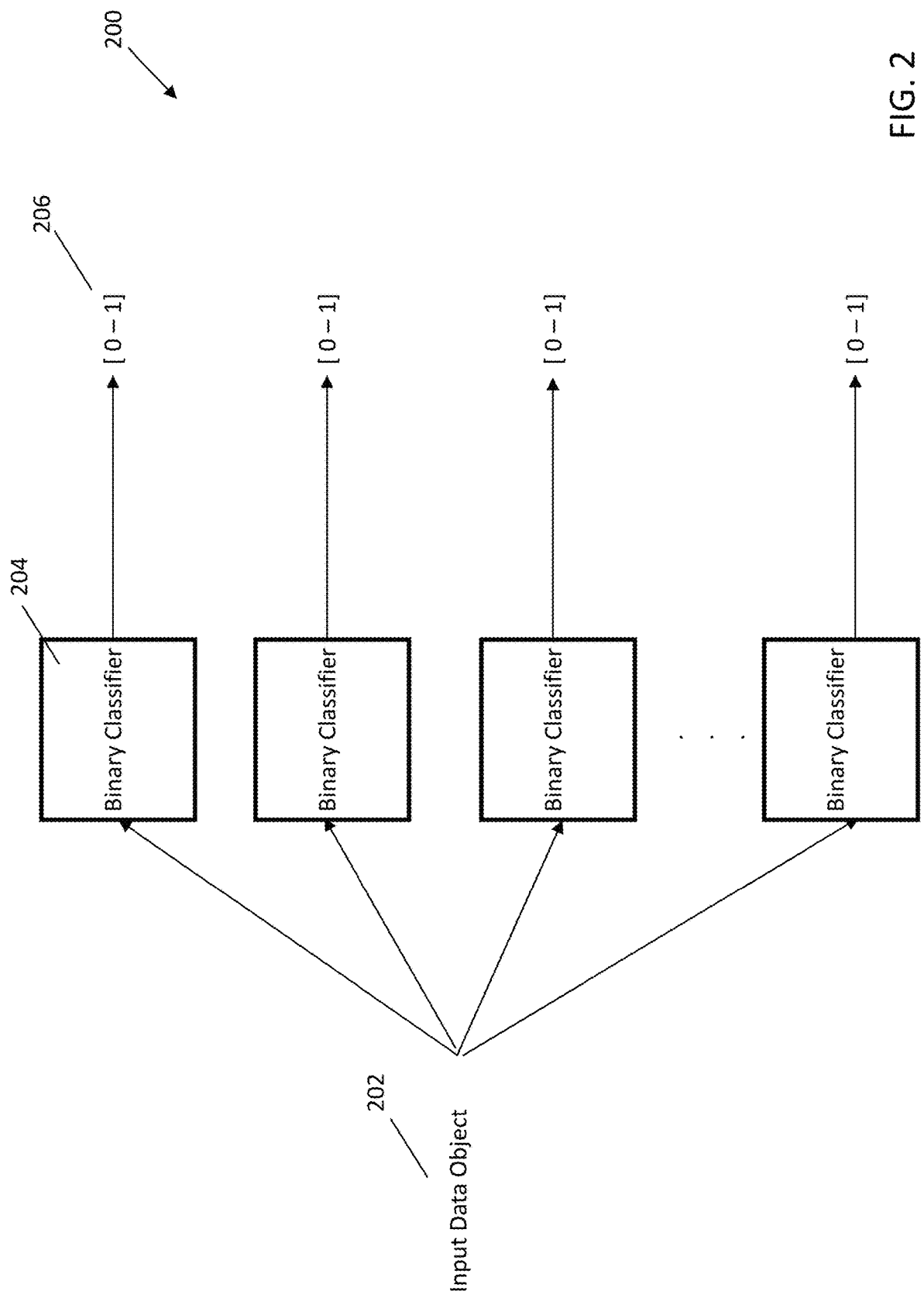

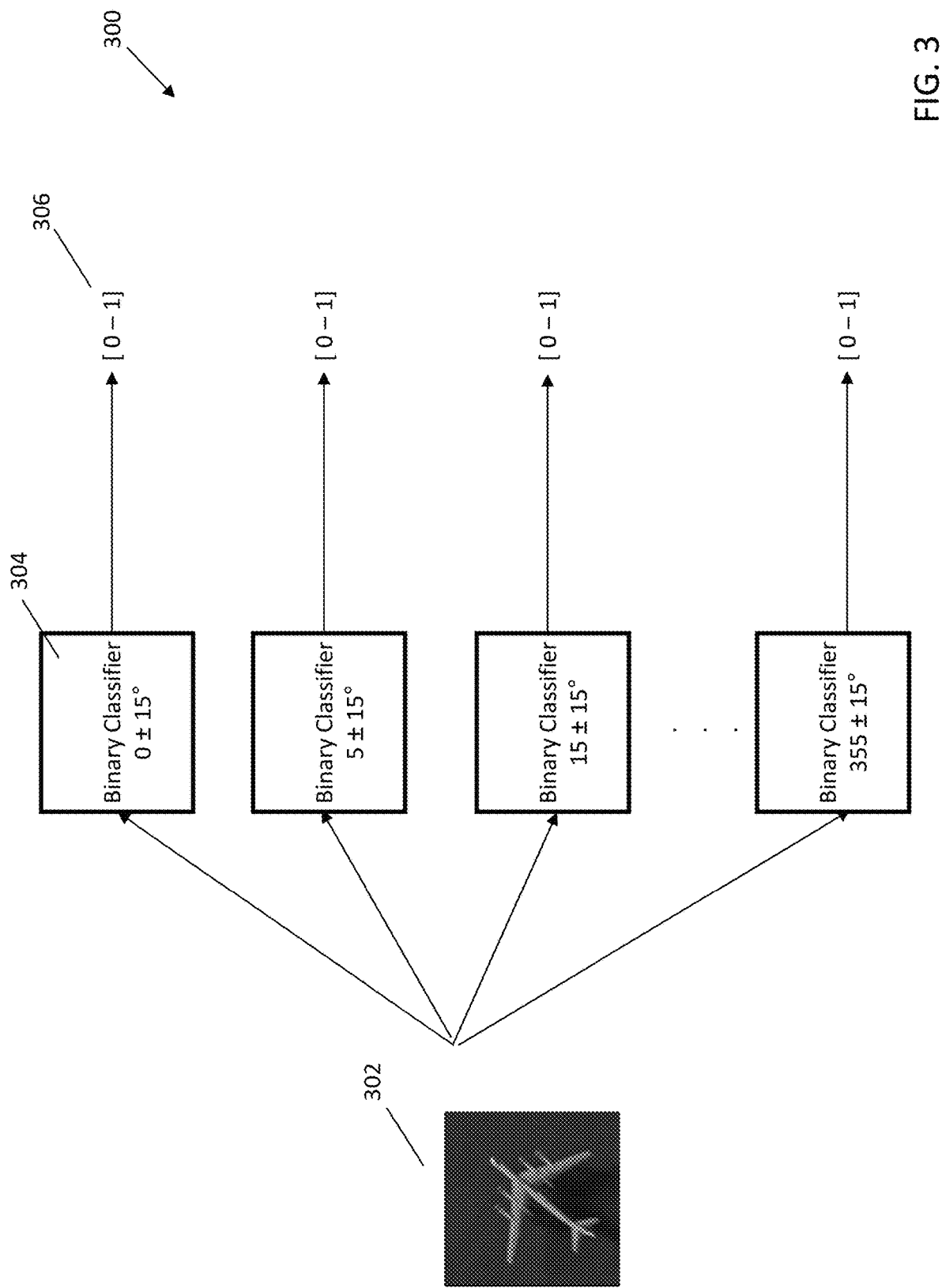

SYSTEMS AND METHODS FOR CHARACTERISTIC CLASSIFICATION AND OBJECT TYPE CLASSIFICATION USING HYPER-TRAINED SUITES OF MACHINE LEARNING MODELS

CROSS REFERENCE TO RELATED APPLICATIONS

This application claims the benefit of U.S. Provisional Application No. 63/318,235, filed Mar. 9, 2022, the entire contents of which is incorporated herein by reference.

FIELD OF THE DISCLOSURE

This disclosure relates to N-way classification using machine learning models, and more specifically, to using a plurality of binary classifiers to not only determine the identity of an object but also one or more characteristics relating to the object.

BACKGROUND OF THE DISCLOSURE

Machine learning classifiers can be useful tools for analyzing large data sets to determine whether the data set includes certain objects or characteristics. For instance, in an image analysis context, machine learning classifiers can be used to analyze images to determine whether any particular image possesses various characteristics. Rather than having a human manually analyze each image, a machine learning classifier can be used to quickly analyze an image and determine whether the image contains characteristics or properties of interest with minimal human intervention, thus saving time and effort.

While using a machine learning classifier to detect characteristics/properties within a data set can overall reduce human effort and time, the process of generating a machine learning classifier can be a time-consuming process. Many machine learning classifiers are generated using a supervised training process in which a classifier is given a large set of training data that has been annotated with the properties/characteristics found within the data, so that the classifier can then "learn" how to find those characteristics/properties in other data sets in which the properties and/or characteristics of the data are not known a priori. The time needed to generate a machine learning classifier (i.e., train the classifier) can be substantially dependent on the complexity of the classification to be performed.

In contrast to a single binary classifier, a multi-class or N-way classifier can take significantly more time to train, can require a significantly larger amount of training data, and can consume larger amounts of computing resources due to its complexity. Given the loss of time associated with training and implementing N-way classifiers, in many instances, the savings engendered by using them to automate data classification tasks may not be worth the effort and time used to generate the classifier.

SUMMARY OF THE DISCLOSURE

According to an aspect, in one or more examples, a multi-class or N-way machine learning classifier can be implemented using a set of hyper-trained binary classifiers. In one or more examples, a characteristic of data which includes a range can be apportioned among a plurality of binary classifiers such that each binary classifier is assigned to a narrow portion of the range of the characteristic. In one or more examples, each binary classifier of the plurality of binary classifiers can be configured to perform a binary classification on the portion of the range assigned to it, so as to determine whether a test data sample has a characteristic within its assigned range.

According to an aspect, the outputs of each of the plurality of binary classifiers can be aggregated to generate a response curve, providing an overall view on the likelihood that a particular test data sample's characteristic falls within the detectable range of each of the classifiers. In one or more examples, the response curve can be used to perform object identification within the data. For instance, in one or more examples, a convolution-based signal processing technique can be used to interpret the response curve and perform object identification within the data. In one or more examples, a matched filter can be applied to a response curve to determine the area of a peak of the curve, and the area associated with non-peak areas of the response curve. In one or more examples, object identification can be based on comparing a ratio of the peak area to the non-peak area with a pre-determined threshold. In one or more examples, the pre-determined threshold can be empirically determined.

According to an aspect, the systems and methods described herein can be applied to image data, in order to perform object identification in an image, as well as determine one or more characteristics associated with the object found in a given image. In one or more examples, the systems and methods described herein can be used to determine the identity of an object of interest in an image as well as the orientation of the object within the image. Such objects of interest can include, for example, aircraft (such as an airplane or helicopter), cars, trucks, boats, tanks, artillery, weapons, etc. Using the exemplary context of image analysis with respect to aircraft, in one or more examples, a plurality of binary classifiers can be generated using a supervised training process, with each binary classifier configured to determine if the orientation of an aircraft in the image is within a particular narrow range of angles. In one or more examples, the plurality of binary classifiers can collectively cover the full 360° range of possible aircraft orientations. In one or more examples, each classifier can be configured to determine whether the aircraft is oriented within the range associated with the classifier or not. In one or more examples, the outputs of each of the classifiers can be aggregated to generate a response curve indicating the likelihood that the plane is oriented at an angle lying within a specific narrow range of angles. In one or more examples, the response curve can be used to identify the specific model of the aircraft in the image (i.e., object identification).

In one or more examples, a method for determining a characteristic of an object using a plurality of machine learning models comprises: determining a range of a characteristic, dividing the range of the characteristic into a plurality of subranges, generating a plurality of binary machine learning classifiers for each subrange of the plurality of subranges, wherein each binary machine learning classifier is configured to generate a confidence score associated with whether an input data object possesses a characteristic value within the subrange associated with the binary machine learning classifier, receiving an input data object, applying the plurality of binary machine learning classifiers to the received input object to generate a plurality of confidence scores, wherein each confidence score of the plurality of confidence scores is generated from a binary machine learning classifier of the plurality of machine learning classifiers, generating a characteristic response data set from the generated plurality of confidence scores, determining a value of the characteristic associated with the input data object from the generated characteristic response data set, and classifying the object based on the generated characteristic response data set.

Optionally, the plurality of binary machine learning classifiers are generated using a supervised training process.

Optionally, the supervised training process comprises: receiving a plurality of training data objects, and annotating each training data object with an indication of whether the data object is within the subrange associated with the binary machine learning classifier undergoing the supervised training process.

Optionally generating a characteristic response data set from the generate plurality of confidence scores comprises generating a characteristic response curve, wherein an x-axis of the curve represents the range of the characteristic, wherein the y-axis of the curve represents a probability that the characteristic of the data object is at a particular value.

Optionally, determining the value of the characteristic associated with the input data object comprises determining a maximum of the characteristic response curve.

Optionally, classifying the object comprises: determining a peak area of the generated response curve, and comparing the determined peak area of the generated response curve to a pre-determined threshold.

Optionally, determining the peak area of the generated response curve comprises applying a matched filter to the generated response curve.

Optionally, classifying the object comprises: determining a non-peak area of the generated response curve, and comparing a ratio of the determined peak area to the determined non-peak area of the generated response curve, to a pre-determined threshold.

Optionally, determining the non-peak area of the generated response curve comprises applying a matched filter to the generated response curve.

Optionally, the input data object comprises an image, wherein the input data object comprises an image of an aircraft, and wherein the characteristic comprises an orientation of the aircraft in the image.

In one or more examples, a system for determining a characteristic of an object using a plurality of machine learning models comprises: a memory, one or more processors, wherein the memory stores one or more programs that when executed by the one or more processors, cause the one or more processors to: determine a range of a characteristic, divide the range of the characteristic into a plurality of subranges, generate a plurality of binary machine learning classifiers for each subrange of the plurality of subranges, wherein each binary machine learning classifier is configured to generate a confidence score associated with whether an input data object possesses a characteristic value within the subrange associated with the binary machine learning classifier, receive an input data object, apply the plurality of binary machine learning classifiers to the received input object to generate a plurality of confidence scores, wherein each confidence score of the plurality of confidence scores is generated from a binary machine learning classifier of the plurality of machine learning classifiers, generate a characteristic response data set from the generated plurality of confidence scores, determine a value of the characteristic associated with the input data object from the generated characteristic response data set, and classify the object based on the generated characteristic response data set.

Optionally, the plurality of binary machine learning classifiers are generated using a supervised training process.

Optionally, the supervised training process comprises: receiving a plurality of training data objects, and annotating each training data object with an indication of whether the data object is within the subrange associated with the binary machine learning classifier undergoing the supervised training process.

Optionally, generating a characteristic response data set from the generate plurality of confidence scores comprises generating a characteristic response curve, wherein an x-axis of the curve represents the range of the characteristic, wherein the y-axis of the curve represents a probability that the characteristic of the data object is at a particular value.

Optionally, determining the value of the characteristic associated with the input data object comprises determining a maximum of the characteristic response curve.

Optionally, classifying the object comprises: determining a peak area of the generated response curve, and comparing the determined peak area of the generated response curve to a pre-determined threshold.

Optionally, determining the peak area of the generated response curve comprises applying a matched filter to the generated response curve.

Optionally, classifying the object comprises: determining a non-peak area of the generated response curve, and comparing a ratio of the determined peak area to the determined non-peak area of the generated response curve, to a pre-determined threshold.

Optionally, determining the non-peak area of the generated response curve comprises applying a matched filter to the generated response curve.

Optionally, the input data object comprises an image, wherein the input data object comprises an image of an aircraft, and wherein the characteristic comprises an orientation of the aircraft in the image.

In one or more examples, a non-transitory computer readable storage medium can store one or more programs for determining a characteristics of an object using a plurality of machine learning models, the programs for execution by one or more processors of an electronic device that when executed by the device, cause the device to: determine a range of a characteristic, divide the range of the characteristic into a plurality of subranges, generate a plurality of binary machine learning classifiers for each subrange of the plurality of subranges, wherein each binary machine learning classifier is configured to generate a confidence score associated with whether an input data object possesses a characteristic value within the subrange associated with the binary machine learning classifier, receive an input data object, apply the plurality of binary machine learning classifiers to the received input object to generate a plurality of confidence scores, wherein each confidence score of the plurality of confidence scores is generated from a binary machine learning classifier of the plurality of machine learning classifiers, generate a characteristic response data set from the generated plurality of confidence scores, determine a value of the characteristic associated with the input data object from the generated characteristic response data set, and classify the object based on the generated characteristic response data set.

Optionally, the plurality of binary machine learning classifiers are generated using a supervised training process.

Optionally, the supervised training process comprises: receiving a plurality of training data objects, and annotating each training data object with an indication of whether the data object is within the subrange associated with the binary machine learning classifier undergoing the supervised training process.

Optionally, generating a characteristic response data set from the generate plurality of confidence scores comprises generating a characteristic response curve, wherein an x-axis of the curve represents the range of the characteristic, wherein the y-axis of the curve represents a probability that the characteristic of the data object is at a particular value.

Optionally, determining the value of the characteristic associated with the input data object comprises determining a maximum of the characteristic response curve.

Optionally, classifying the object comprises: determining a peak area of the generated response curve, and comparing the determined peak area of the generated response curve to a pre-determined threshold.

Optionally, determining the peak area of the generated response curve comprises applying a matched filter to the generated response curve.

Optionally, classifying the object comprises: determining a non-peak area of the generated response curve, and comparing a ratio of the determined peak area to the determined non-peak area of the generated response curve, to a pre-determined threshold.

Optionally, determining the non-peak area of the generated response curve comprises applying a matched filter to the generated response curve.

Optionally, the input data object comprises an image, wherein the input data object comprises an image of an aircraft, and wherein the characteristic comprises an orientation of the aircraft in the image.

BRIEF DESCRIPTION OF THE FIGURES

The invention will now be described, by way of example only, with reference to the accompanying drawings, in which:

FIG. 2 illustrates an exemplary hyper-trained suite of machine learning models (binary classifiers) to achieve multi-class classification according to examples of the disclosure.

FIG. 3 illustrates an exemplary application of using a hyper-trained suite of machine learning models (N binary one-vs-all classifiers) according to examples of the disclosure.

DETAILED DESCRIPTION OF THE DISCLOSURE

Figure 1A:
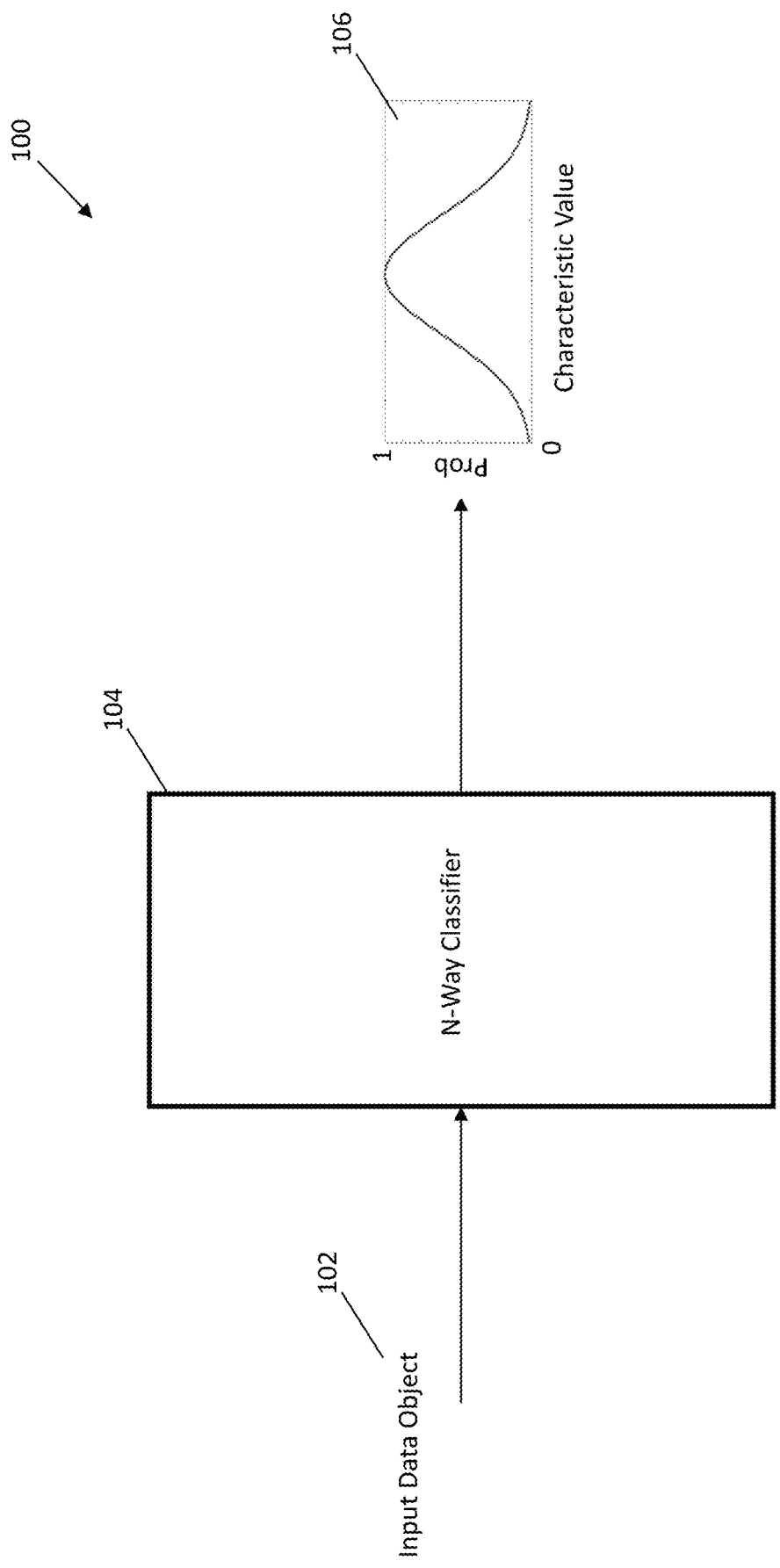
FIGS. 1A-1B illustrate an exemplary multi-dimensional classifier according to examples of the disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Described herein are systems and methods for generating multi-class machine learning classifiers using a set of hyper-trained binary classifiers to perform both object type classification and characteristic detection on data sets analyzed by the set of classifiers. In one or more examples, a range associated with characteristic of the data sought to be classified is divided into a set of sub-ranges that can be ordered. In one or more examples, a set of binary machine learning classifiers are generated, with each binary classifier of the set of binary classifiers associated with a sub-range of the set of sub-ranges. In one or more examples, each binary classifier of the set of classifiers is generated by training the classifier to determine if a given input data set contains a characteristic within or outside of the sub-range associated with the binary classifier. This can also be thought of as breaking down an N-way classification problem into a one-vs-all classification problem with N binary classifiers, applied to a characteristic of the data that has an ordered range. In one or more examples, each binary classifier of the plurality of classifiers is trained using a supervised training process. In one or more examples, the supervised training process includes providing the classifier with training data that has been annotated to indicate whether the data is within the sub-range associated with the binary classifier or outside the sub-range associated with the classifier. In one or more examples, each binary classifier of the plurality of classifiers can be configured to generate a confidence score indicating the likelihood that the input data contains the data within the sub-range of the characteristic associated with the binary classifier.

In one or more examples, once the binary classifiers have been generated, they can be used to not only determine what value within the ordered range of the characteristic the data has, but can also be used to determine other properties about the data. In one or more examples, a common data set can be put through each of the binary classifiers of the plurality of binary classifiers, with each binary classifier providing a confidence score indicating the likelihood that the input data set has data that matches the sub-range of the characteristic associated with each classifier. Due to the fact that the characteristic has values that have a natural order, the outputs of each binary classifier can be aggregated to form a response curve that indicates the most likely sub-range of the characteristic that the data contains over the entire range of the characteristic.

In one or more examples, the response curve can be used to not only determine whether the input data set includes a given characteristic, but can also be used to make other classifications of the data beyond the characteristic associated with the set of binary classifiers. In one or more examples, a matched filter can be applied to the data to determine an area associated with the peak of the response curve, and an area associated with non-peak areas associated with the response curve. In one or more examples, the ratio between the peak areas and the non-peak areas can be used to ascertain whether the input data to the classifiers includes a second characteristic that is different from the characteristic associated with the one or more classifiers.

The above systems and methods can be applied to many contexts. As an example, the above systems and methods can be used to determine the orientation of an aircraft depicted in image data. In one or more examples, the range of orientations (0-360°) can be divided into a plurality of sub-ranges. A binary classifier can be generated for each sub-range and trained to determine whether an input image to the classifier depicts an aircraft that is oriented within the sub-range associated with the classifier. The outputs of each of the binary classifiers can then be aggregated to generate a response curve showing distribution of likelihoods that an aircraft depicted in the image is oriented at a particular angle. In one or more examples, the response curve can also be used to determine whether the aircraft is of a certain type by comparing the ratio of the peak areas of the curve to the non-peak areas with a pre-determined threshold. An aircraft is used herein as an example only, and the systems and methods can be applied similarly with respect to other objects such as cars, trucks, boats, tanks, artillery, weapons, etc.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

Machine learning classifiers can be useful to automate the process of searching for the presences of characteristics, patterns, and other features in data sets. While a human could look at an individual data set and determine whether the set includes one or more characteristics, having to perform that task quickly on voluminous data sets can be time and labor intensive and thus not feasible. Machine learning can represent a method of data analysis that allows for the "machine" to learn from data, identify one or more patterns it can use to identify characteristics, and then make decisions about what characteristics are in a data set based on what it has learned from prior data. Machine learning classifiers have uses in a variety of contexts. For instance, machine learning can be used in image analysis, medical diagnosis, speech recognition, and other uses in which characteristics of data can be gleaned by analyzing and searching for patterns in the data.

Multi-class machine learning classifiers (also known as N-way, multi-way classification, multiclass classification) are a type of machine learning classifier in which the classifier is trained to determine whether a particular data point or image falls into one of several categories or classes. For instance, in the image analysis context, if a user wanted to determine if a particular image included either airplanes, cars, or boats (but not a mix of these objects), then a multi-way or N-way classifier could be employed that would be configured to simultaneously search for all three characteristics and determine the probability that the image contains an airplane, the probability that the image contains a car, and the probability that the image contains a boat. Assuming that an image would have exactly one of the three, then ideally the total probability output by the classifier would equal to 100%.

Multi-class machine learning classifiers can also be useful to determining characteristics of a data that include a range. For instance, if images of human subjects were being analyzed to determine the height of the human appearing in the image, a multi-class classifier could be employed to automate the process of determining the height of the subject in the image. In such an example, the problem of determining the height of a person in an image can be represented as a multi-class classifier in which each class or category represents a specific height or range of heights. Thus, the output of the classifier could represent a probability that the human subject in the image is of a certain height.

FIG. 1A illustrates an exemplary multi-class classifier according to examples of the disclosure. In one or more examples, the example N-way classifier 100 of FIG. 1A can include an input data object 102. The input data object 102 can represent the data item (e.g. an image) to be analyzed by the machine learning classifier. In one or more examples, the input data object 102 can be fed into a N-way classifier 104 that can be configured to generate classification probabilities across multiple categories. Thus in one or more examples, the N-way classifier 104 can take the input data object 102, analyze the data object to determine the presence of multiple patterns or characteristics of data, then output a set of probability or confidence scores pertaining to the likelihood that the data object 102 falls into a particular category. For instance, if a N-way classifier 104 performs a four-way classification, then in one or more examples, the output of the N-way classifier 106 can comprise four confidence scores representing the probability that the input data object is of one of those four classes. In one or more examples, a confidence score can represent a value from 0-1, pertaining the likelihood that a data object 102 contains a specific characteristic that falls into one of the various classes. A confidence score of 1 would represent a 100% likelihood that the data object contains a characteristic that falls into the associated class, while a confidence score of 0 would represent a 0% likelihood that the data object 102 contains a characteristic that falls into the associated class. In one or more examples, if the plurality of characteristics are mutually exclusive (i.e., the data object 102 did not possess two or more the characteristics associated with the classifier 104, but included exactly one), then the sum of the confidence scores would sum equal to 1.

In one or more examples, the output 106 of the N-way classifier can be represented by a curve. For instance, if the N-way classifier is used to determine a characteristic with an ordered numerical range, that is present in the input data object 102, then in one or more examples, the output of the classifier can be represented by a curve as depicted in FIG. 1A. In the example of an N-way classifier being used to determine where in a characteristic's range a particular input data object lies, the x-axis of the curve can represent the range of the characteristic, and the y-axis can represent the probability that the input data object 102 had data that matches the value of the characteristic depicted on the x-axis. For the purpose of providing a tangible example, an exemplary context for use of the classifier described above with respect to FIG. 1A is provided below with respect to FIG. 1B.

Figure 1B:
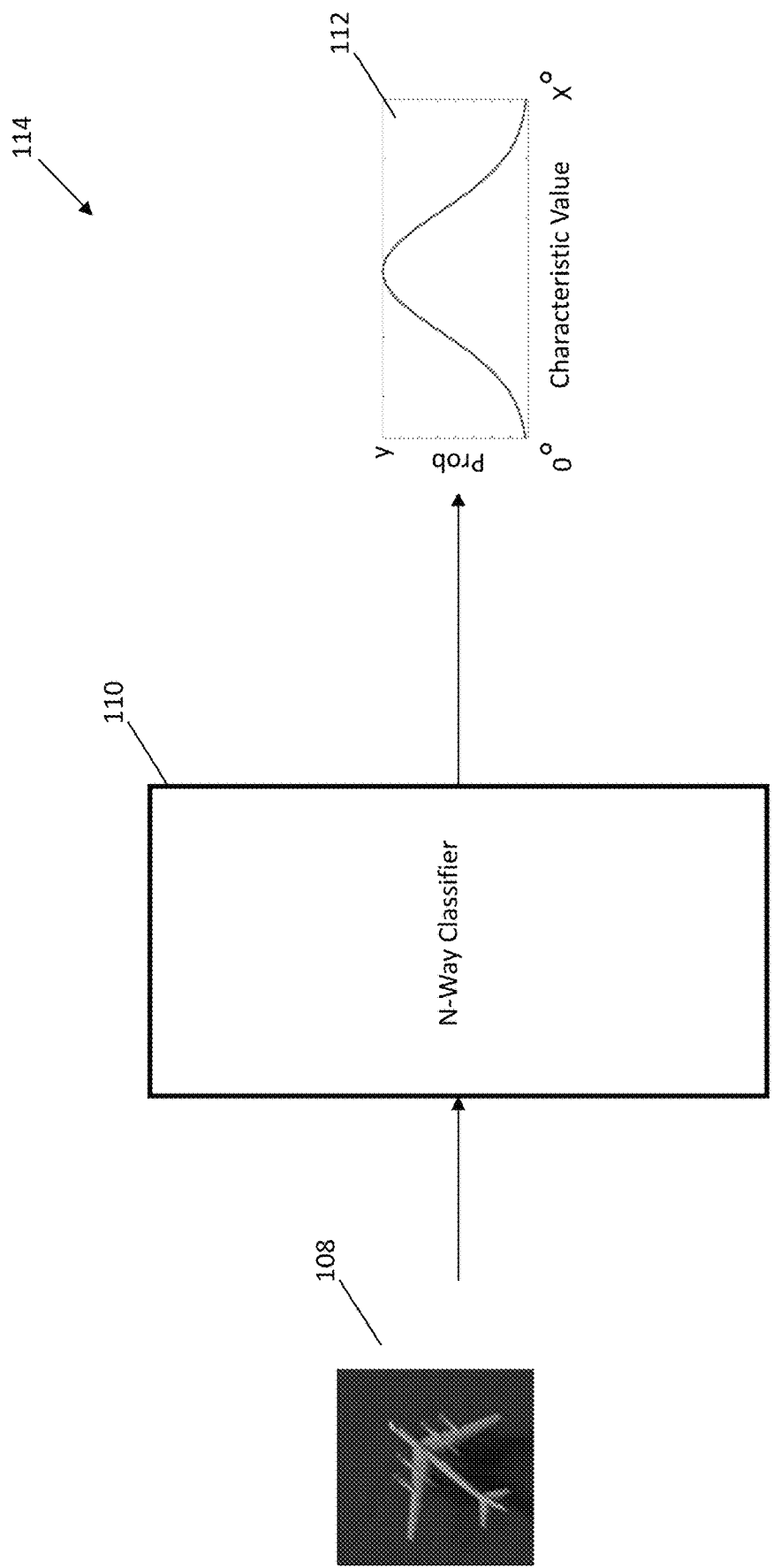

In the example 114 of FIG. 1B, the input data object 108 can represent an image of an aircraft. In one or more examples, the input data object 108 may represent other objects such as cars, trucks, boats, tanks, artillery, weapons, etc. In one or more examples, the N-way classifier 110 can be trained and configured to determine the angle of orientation of the aircraft in the image. For instance, if the aircraft is facing the top of the image, while its tail is facing the bottom of the image, then the orientation of the aircraft can be said to be 0°. If the aircraft instead is facing the opposite direction such that the nose of the aircraft is facing the bottom of the image, while the tail is facing the top of the image, then the orientation of the aircraft can be said to be 180°. As shown in FIG. 1B, the output 112 of the N-way classifier 110 can be represented by a response curve such that the x-axis represents the value of the orientation (i.e., 0-360°) while the y-axis represents the confidence score or probability that the input image 108 is orientated at a particular value of the x-axis. The example of FIG. 1B is meant for illustration purposes and should not be seen as limiting. For purposes of example, the example of using a machine learning classifier (or a plurality of machine learning classifiers) to determine the identity and orientation of an aircraft in an image will be used as example application of the concepts and techniques discussed below. The example however should not be seen as limiting, and the techniques and systems described below can also be applied to other contexts as would readily be apparent to a person of ordinary skill in the art.

In one or more examples, training a N-way learning classifier can be a time intensive and complex procedure. For instance, an N-way classifier can be architecturally complex and require a large amount of training data to implement and thus a long training period. The time and complexity needed to implement the classifier can be proportional to the number of classes the classifier is configured for, meaning that the larger the number of classes, the more complex the classifier will be and the more training data will be required to train the classifier to perform the multi-class classification. In contrast, a binary classifier can be relatively simple to implement. In one or more examples, a binary classifier can refer to a classifier which determines if a data object possesses a characteristic or not. In one or more examples, a binary classifier can output a single confidence score indicating the probability that the data object includes the characteristic associated with the binary classifier. Since the classifier only has to be trained to examine one specific characteristic, the training of a single binary classifier is simpler and the architecture of the classifier is less complex in contrast to a single multi-dimensional classifier.

In one or more examples, an N-way classifier such as the one described above with respect to FIGS. 1A-1B can be implemented using a plurality of binary classifiers. In one or more examples, and as described in further detail below, decomposing an N-way classification problem into a plurality of N binary one-vs-all classifiers can not only reduce the complexity and time required to train the machine learning classifier, but can also lessen the burden on the object classification layer by decomposing the classification problem into a set of separate and independent models (that can be trained in parallel), thus improving computational efficiency and performance.

FIG. 2 illustrates an exemplary multi-class classifier using a hyper-trained suite of machine learning models according to examples of the disclosure. In one or more examples, the system 200 of FIG. 2 can include an input data object 202, similar to input data object 102 of FIG. 1A. In contrast to the example of FIGS. 1A-1B, the input data object 202 can be fed to a plurality of binary classifiers 204, rather than a single N-way classifier as in the example of FIG. 1A. Each binary classifier 204 of the system 202 can be configured to determine if the input data object 202 includes a characteristic that falls into a specific class (or not). In one or more examples, each binary classifier can output a confidence score, which can represent the likelihood that the input data object 202 includes the characteristic associated with the binary classifier. In one or more examples, and as illustrated in the figure, the confidence score 206 can be represented as a number between 0 and 1, with a 0 meaning that the input data object does not include the characteristic associated with the classifier, and a score of 0 indicating that the input data object 202 includes the characteristic with a 100% confidence level. Each classifier 204 can have its own output 206 as illustrated in FIG. 2, with the output representing the confidence score associated with the characteristic that the binary classifier is trained to detect/classify.

In one or more examples, an N-way classifier that is being used to determine the value of a characteristic (wherein the characteristic could fall within a range of values) present within an input data object can also benefit from decomposing the N-way classifier into a plurality of binary machine learning classifiers. In one or more examples, the full range associated with the characteristic can be decomposed into a plurality of sub-ranges, with each sub-range being assigned to a binary machine learning classifier. Each binary classifier can then be trained to determine whether an input data object includes data with a characteristic that is within the sub-range assigned to the binary machine classifier. Referring back to the example system 200 of FIG. 2, the output 206 of each classifier can represent a confidence score from 0 to 1, indicating the likelihood that the input data object has a characteristic value that is within the sub-range associated with the binary classifier.

An exemplary context, such as the one provided above with respect to FIG. 1B can be useful to understand the operation of the system described above with respect to FIG. 2. Thus, in one or more examples, the systems and methods described above with respect to FIG. 2 can be applied to an image analysis context in which image data containing aircraft can be analyzed to determine the orientation of the aircraft. Thus, FIG. 3 illustrates an exemplary application of an N-way classifier using a hyper-trained suite of machine learning models according to examples of the disclosure. In one or more examples, the input data object 302 of the system 300 can be in the form of an image that contains an aircraft. In one or more examples, the collective goal of the classifiers can be to determine the orientation of the aircraft in the image, similar to the context described above with respect to FIG. 1B.

In contrast to the example of FIG. 1B, rather than using a single N-way classifier, instead the N-way classification can be decomposed into a plurality of binary classifiers using the systems and methods described above with respect to FIG. 2. In one or more examples, the 0-360° range of orientation can be divided into a plurality of subranges. For instance in one or more examples, the range can be divided into 72 subranges, with each range spaced five degrees apart from one another. In one or more examples, the ranges can overlap. For instance, as illustrated in FIG. 3, each classifier can have a distinct center angle, with a range of +15°. Thus, in one or more examples, each classifier's center angle can be 5° apart from its adjacent classifier, but will have a range that overlaps with its adjacent classifier. For instance the first classifier of the set of binary classifiers 304 can have a center angle of 0° and represent a range from −15° to +15°, while its adjacent classifier can have a center angle of 5° with a range from −10° to +20°. The number of subranges, and the range of each classifier can be empirically determined so as to minimize the error in classification. The training of each classifier will be discussed in further detail below.

In one or more examples, the input data object 302 can be run through each classifier 304, to determine if the input data object 302 is in an orientation that is within the range of each of the classifiers. Thus, in one or more examples, the input image 302 can be run through the first classifier which has been trained to determine if the input image has an aircraft whose orientation is between −15° and +15°. The output 306 of classifier 304 can be a confidence score which ranges from 0-1 and represents the likelihood that the aircraft in the image is within the 0°±15° range of the binary classifier. In one or more examples, the same input image can be run through all 72 classifiers (360°, divided in 5° increments), with each classifier 304 outputting a confidence score 306 representing the likelihood that the aircraft found in the image is orientated in the range associated with the classifier. The aggregation of the output produced by each of the binary classifiers 304 and its use in determining orientation will be discussed in further detail below. In one or more examples, the binary classifiers 304 can be implemented using a variety of classifiers known in the art. For instance, in one or more examples, the binary classifiers 304 can be implement using a convolutional neural network (CNN), such as the Xception classifier.

Training the classifier can be performed using a supervised training process in which annotated training data provides the classifier with positive examples that include the characteristic associated with the classifier, and negative examples that do not include the characteristic associated with the classifier. Each training data object used in the supervised training process can be annotated to indicate whether the data object includes the characteristic or does not include the characteristic.

Figure 4:
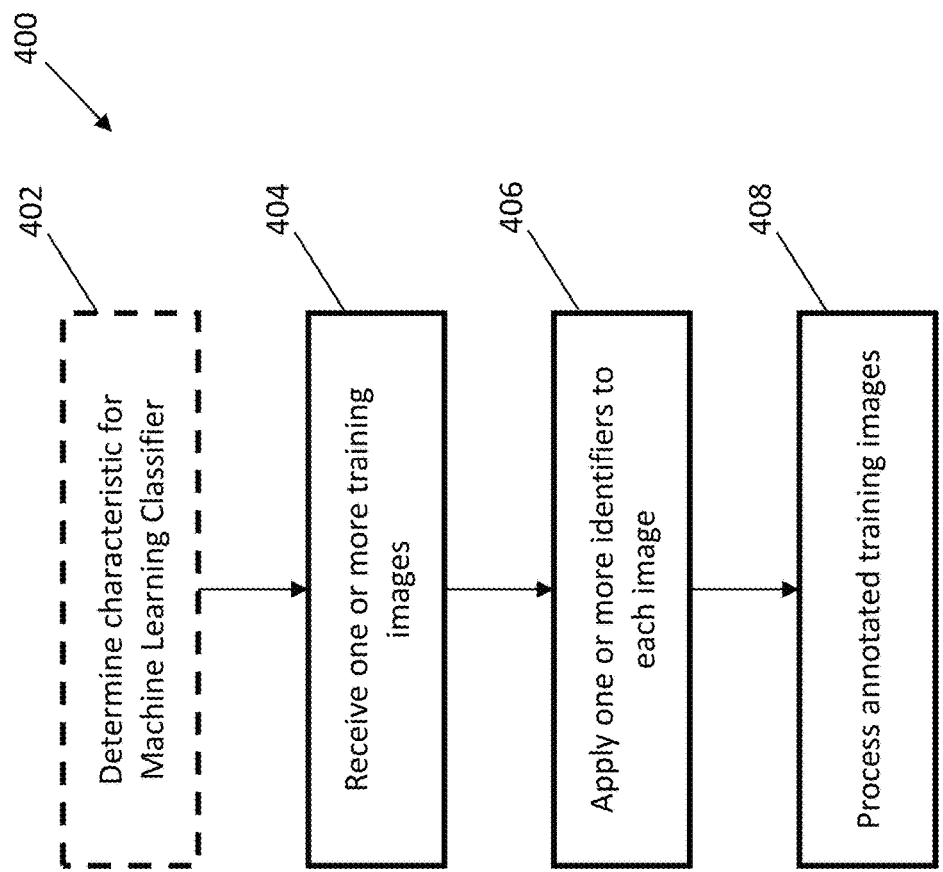
FIG. 4 illustrates an exemplary supervised training process for generating a machine learning model according to examples of the disclosure.

FIG. 4 illustrates an exemplary supervised training process for generating a machine learning model according to examples of the disclosure. In the example of FIG. 4, the process 400 can begin at step 402 wherein a particular characteristic for a given binary machine learning classifier is selected or determined. In one or more examples, the characteristic can be selected based on the overall range of the characteristic and the sub-range of the characteristic as described above with respect to FIG. 3. In one or more examples, step 402 can be optional, as the selection of characteristics needed for the machine learning classifiers can be selected beforehand in a separate process.

Once the one or more characteristics to be classified have been determined at step 402, the process 400 can move to step 404 wherein one or more training images corresponding to the selected characteristics are received. In one or more examples, each training image can include one or more identifiers/annotations that identify the characteristics contained within an image. The identifiers can take the form of annotations that are appended to the metadata of the image, identifying what characteristics are contained within the image.

In one or more examples, if the training images received at step 404 do not include identifiers, then the process can move to step 406 wherein one or more identifiers are applied to each image of the one or more training images. In one or more examples, the training images can be annotated with identifiers using a variety of methods. For instance, in one or more examples, the annotations can be manually applied to the training images by a human or humans who view each training image, determine what characteristics are contained within the image, and then annotate the image with the identifiers pertaining to those characteristics. Alternatively or additionally, the training images can be harvested from images that have been previously classified by a machine classifier. In this way, each of the machine learning classifiers can be constantly improved with new training data (i.e., by taking information from previously classified images) so as to improve the overall accuracy of the machine learning classifier.

In one or more examples, and in the case of segmentation or region-based classifiers such as R-CNNs, the training images can be annotated on a pixel-by-pixel or regional basis to identify the specific pixels or regions of an image that contain specific characteristics. For instance in the case of R-CNNs, the annotations can take the form of bounding boxes or segmentations of the training images. Once each training image is annotated with one or more identifiers at step 406, the process 400 can move to step 408 wherein the one or more training images are used to train each of the machine learning classifiers. In one or more examples, and in the case of CNNs, training a CNN classifier with the training images includes learning the parameter values (weights) of the CNN architecture.

Using the context of image analysis and specifically determining aircraft orientation in images of aircrafts, training the binary classifiers using a supervised training process can include providing each binary classifier a plurality of examples in which the aircraft is oriented in the range of the classifier and also providing the classifier with negative images in which the orientation of the aircraft is outside of the range classifier (which covers the classes represented by all the other binary classifiers, in what is referred to as one-vs-all classification). Thus, in one or more examples, annotating the training data can simply require indicating whether the training image is a positive example or negative example vis-à-vis the range of the binary classifier being trained. In this way, the process of training the classifier can be simplified with respect to an N-way classifier by decomposing an N-way classifier into a plurality of one-vs-all binary classifiers that can be trained independently from each other and in parallel.

Once the binary classifiers have been trained in accordance with the methods described above, they can be deployed to perform an N-way classification. In order to perform the N-way classification, the outputs of each of the binary classifiers (i.e., the confidence scores generated by each classifier in response to an input data object) can be aggregated and analyzed to determine the nature of the characteristic or characteristics that the input data object possesses. By decomposing the N-way classifier into a plurality of binary classifiers, not only is the overall complexity of the system and the complexity of the training process reduced, but the time and computing resources required to carry out a classification task can also be less onerous than if the classification task employed a single N-way classifier.

Figure 5:
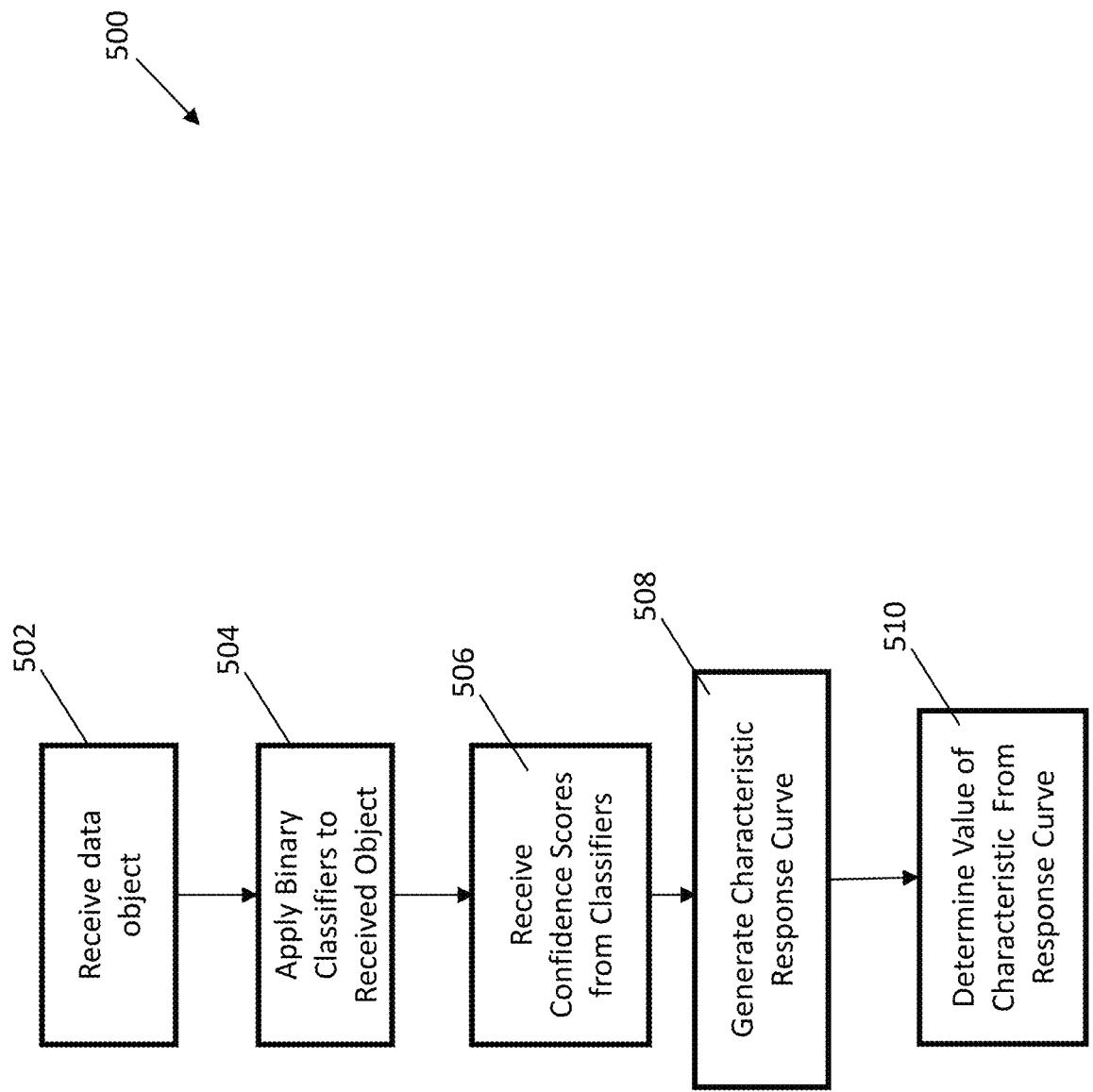
FIG. 5 illustrates an exemplary process for performing N-way classification using hyper trained suites of machine learning models according to examples of the disclosures.

FIG. 5 illustrates an exemplary process for performing N-way classification using a hyper trained suite of machine learning models according to examples of the disclosures. In one or more examples, the process 500 discussed below can be performed using a system such as the one described above with respect to FIG. 2 in which a N-way classifier is decomposed into a plurality of hyper-trained binary classifiers that can collectively determine one or more characteristics associated with an input data object (i.e., data that was not used to train the model.) In one or more examples, the process 500 of FIG. 5 can begin at step 502 wherein an input data is object is received. In one or more examples, the precise nature of the input data object can reflect the context in which the classifier or suite of classifiers is being used. For instance, in one or more examples, the input data object received at step 502 can include images when the classifier is used in an image analysis context. In one or more examples, the input data object received at step 502, in contrast to a training dataset, does not have any a priori information regarding the characteristic to be determined, thus leaving it for the classifier (which has been trained with training data in which the presence of a characteristic is known a priori) to determine the precise nature of a characteristic found (or not found) within the data object. The input data object received at step 502 is new, unseen data not used to train any of the classifiers in step 504 of FIG. 5.

In one or more examples, once the data object has been received at step 502 in FIG. 5, the process 500 can move to step 504 wherein the plurality of trained binary machine learning classifiers can be applied to the data object. In one or more examples, "applying" the plurality of binary machine classifiers at step 504 can include taking the input data object and inputting the data object received at step 502 into each of the trained binary classifiers individually in parallel (although not necessarily simultaneously) such that the input data object is analyzed separately and independently by each of the binary classifiers of the plurality of binary classifiers. "Applying" the data object to a trained machine learning model in this context means using the trained model to predict the class that the input data object belongs to, with some confidence score. Once the trained binary classifiers have been applied to the input data object at step 504, the process 500 can move to step 506 wherein the resultant confidence scores generated by each classifier are received and stored by the process 500. In one or more examples, the confidence scores individually may not lend themselves to determining the precise nature of the characteristic being analyzed, but collectively can be used to determine the nature of the characteristic. For instance in the example of when a characteristic falls within a range of values, then each individual output of a classifier by itself may not lend itself to determining what the value of the characteristic is with respect to the input data object, but the confidence scores of the plurality of classifiers can be collectively used to determine the nature of the characteristic.

In one or more examples, and as described above with respect to FIGS. 1A-1B, when applied to characteristics that have a range with natural ordering (e.g. orientation), an N-way classifier can be used to generate a response curve which shows the probability distribution across values of a characteristic. For instance, in the airplane context described above with respect to FIG. 1B, the output of the N-way classifier can be a response curve showing the probability distribution of orientation angles, which can be used to determine the likely angle of orientation of an aircraft depicted in an image. In one or more examples, the outputs of the set of binary classifiers used to decompose the N-way classifier can also be used to generate a response curve, similar to what would have been produced by a single N-way classifier. Thus, in one or more examples, once the confidence scores from each of the binary machine learning classifiers has been received at step 506 in FIG. 5, the process 500 can move to step 508 wherein the confidence scores are used to generate a response curve.

In one or more examples, the x-axis of the response curve can represent the values of the characteristics, while the y-axis represents the confidence score, i.e. probability that the input data object has the characteristic value indicated by the x-axis. In one or examples, since each binary classifier of the plurality of binary classifiers was associated with a sub-range of the full range of values of the characteristic, the output of a binary classifier can be represented as a two-dimensional data point, with the x-axis value representing the value of the center of the sub-range, and the y-axis value representing the confidence score. Thus, in one or more examples, generating a characteristic response curve at step 508 can include mapping each of the confidence scores to a two-dimensional graph.

In one or more examples, once the response curve is generated at step 508, the process 500 can move to step 510 wherein the value of the characteristic can be determined from the response curve. In one or more examples, determining the value of the characteristic can include determining what x-axis value yields the maximum y-value of the curve. In one or more examples, the x-axis value that corresponds to the maximum y-value of the curve can represent the most likely value of the characteristic associated with the input data object. Using the examples of aircraft orientation in an image, the x-axis value that corresponds to the maximum y-value can represent the most likely orientation of the aircraft in the image.

In one or more examples, decomposing an N-way classifier by decomposing a characteristic into sub-ranges and then training a plurality of binary classifiers to each detect a sub-range of the sub-ranges can unexpectedly also allow for identification of an object type (e.g. airplane type) that displays the characteristic. For instance, in one or more examples, if the training data set (which includes training data exhibiting different values of the characteristic) includes a consistent object type to exemplify the characteristic, then in one or more examples, the plurality of binary classifiers trained on such training data can also be used to identify whether the object type that was in the training data used to train the classifiers, is also present in a new input data example that is being used for prediction/evaluated. Using the example context of determining aircraft orientation from image data, if all the training data used to train classifiers to recognize various orientations contains the same aircraft type, then the set of binary classifiers generated from the training process can not only be used to determine orientation, but can also be used to determine whether the aircraft in a new image to be evaluated is the same type of aircraft that was used to train the classifiers to recognize orientation.

Figure 6A:
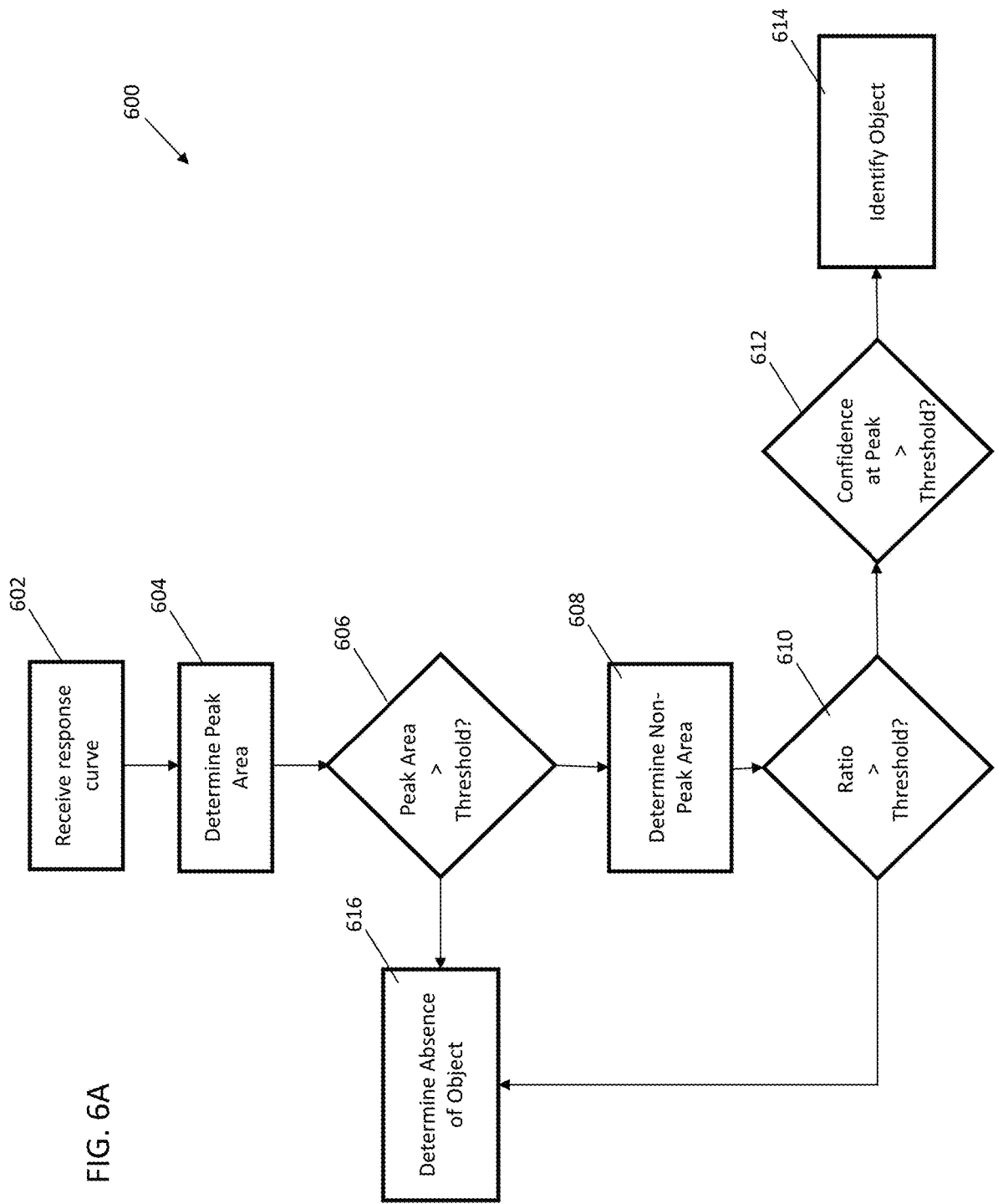
FIGS. 6A-6B illustrate an exemplary process for performing object type classification using hyper trained suites of machine learning models according to examples of the disclosure.

In one or more examples, in order to perform object identification from characteristic classification data, the response curve generated from the set of binary classifiers can be processed and analyzed in order to perform object type identification. FIG. 6A illustrates an exemplary process for performing object type identification/classification using hyper trained suites of machine learning models according to examples of the disclosure. In one or more examples, the process 600 of FIG. 6A can begin at step 602 wherein a characteristic response curve is received from a plurality of binary machine learning classifiers. In one or more examples, the response curve received at step 602 can be generated using the process described above with respect to FIG. 5, and specifically with respect to 508 wherein a characteristic response curve is generated by aggregating the output from the plurality of binary machine learning classifiers.

Figure 6B:
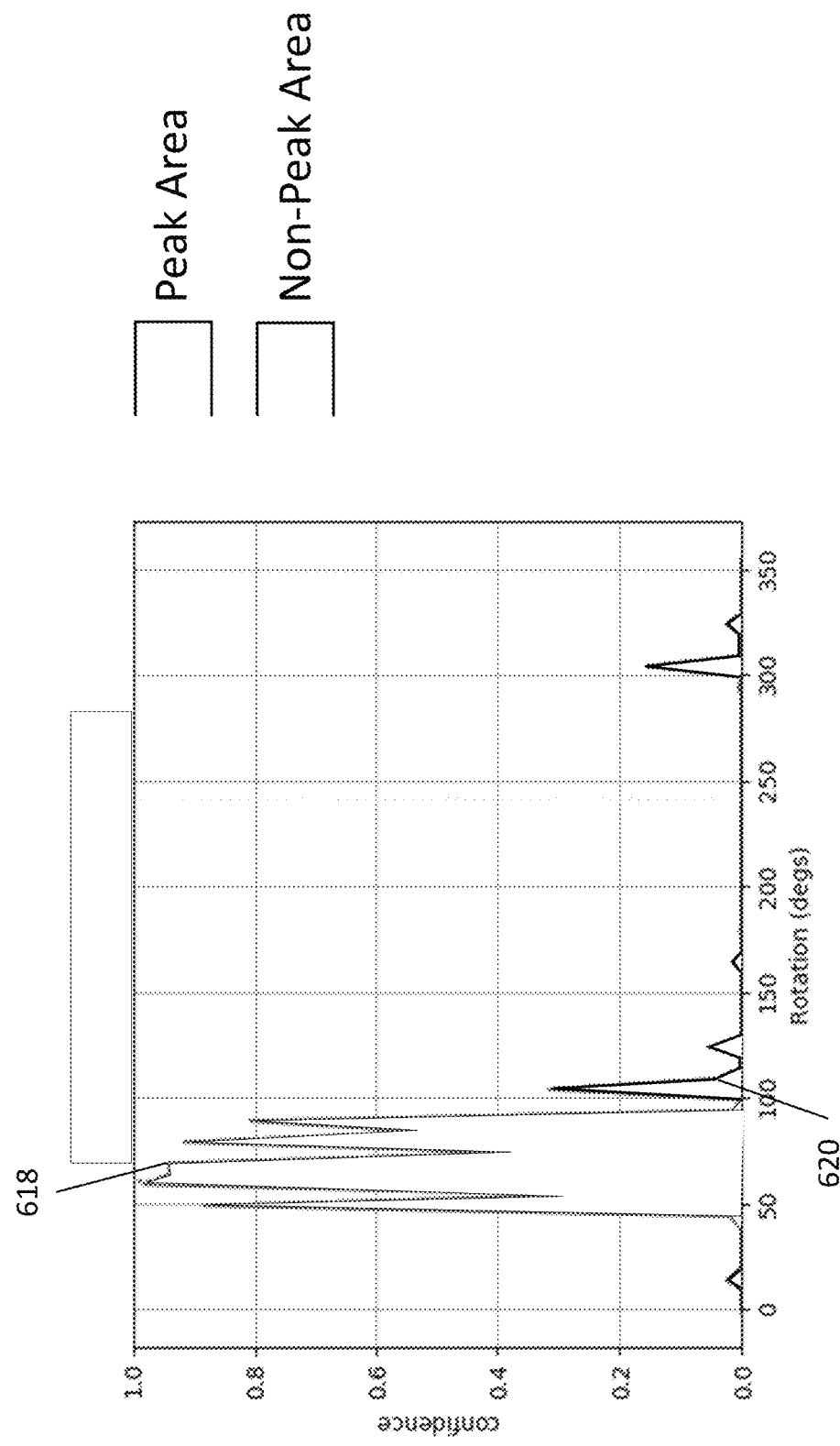

In one or more examples, once the response curve is received at step 602, the process 600 can move to step 604 wherein a peak area of the response curve is determined. In order to exemplify the peak area, an example response curve (i.e., evaluation data) can be useful. FIG. 6B illustrates exemplary evaluation data according to examples of the disclosure. The response curve 616 illustrated in FIG. 6B can represent a response curve from a plurality of binary classifiers trained to determine aircraft orientation from image data similar to the examples described above. As illustrated in the example response curve 616 of FIG. 6B, the curve includes a plurality of areas in which the confidence score (shown on the y-axis) is non-zero (or at least has a value that is above the noise floor). In one or more examples, the response curve 616 includes a peak area 618, corresponding to the area in which the maximum confidence score or scores are found. Additionally, the response curve 616 also includes a plurality of non-peak areas 620 in which there is a non-zero confidence score, but for which the confidence score is below the maximum confidence score of the peak area 616.

Returning to the example of FIG. 6A, at step 604 the peak area of the response curve (i.e., the area under the peak associated with the maximum value of the response curve) can be calculated or determined using a variety of methods. For instance, in one or more examples, one or more convolution-based signal processing techniques can be used to determine, for instance by matching a target signal such as a matched filter, to the response curve to determine the total area of the peak area of a response curve. In one or more examples, the width of the matched filter can be based on the width of the sub-ranges used to create the binary-machine classifiers. Thus, if instead of using 72 classifiers, the N-way classifier was decomposed into fewer binary classifiers, then the width of the match filter could become larger to account for the wider sub-ranges of each classifier.

In one or more examples, once the peak area is determined at step 604, the process 600 can move to step 606 where the peak area is compared against a pre-determined threshold to determine whether the object type from which the characteristic is derived is the same object type that was used to train the classifier. In one or more examples, if the peak area is determined to be less than the pre-determined threshold, then the process 600 can move to step 616 wherein a determination is made that the object is not the same object as the one used in the training process. In one or more examples, if the peak area is smaller than the threshold, then the maximum confidence score maybe such that the object found in the data is not of the same type used to train the classifiers. Using the examples of airplane orientation, if the orientation training data used a Tupolev-95 (Tu-95) to teach the classifiers to determine orientation, then in one or more examples, if the peak area is below a threshold (i.e., the confidence score is low) then the input image to the classifier may not contain a Tu-95 aircraft. For instance, if the input data object contained a different type of aircraft, then in one or more examples, the maximum confidence score may be low. In one or more examples, the pre-determined threshold associated with step 606 can be empirically determined.

In one or more examples, if the peak area is greater than the pre-determined threshold, then the process 600 can move on to perform further checks to determine if the object associated with the characteristic is the same object type that was used to train the plurality of binary machine learning classifiers. For instance in one or more examples, if the peak area is found to be greater than the pre-determined threshold at step 606, the process 600 can move to step 608 wherein a non-peak area can be determined. In one or more examples, a non-peak area can refer to a portion of a response curve in which there is a substantial rise in the confidence scores, but such that no confidence score in the area is greater than the maximum confidence score associated with the peak area. In one or more examples, the non-peak area can be determined using convolution-based signal processing techniques such as using a matched filter to determine the peak area.

In one or more examples, once the non-peak area has been determined at step 608, the process 600 can move to step 610 wherein the ratio of the peak area to the non-peak area can be calculated and compared against a pre-determined threshold. By taking the ratio, a check can be made that the peak area is sufficiently greater than the non-peak area, which can be another indicator that the object in the data which exhibits the characteristic associated with the response curve is the same object type that was used to train the plurality of machine learning classifiers. In one or more examples, the pre-determined threshold that the ratio is compared to at step 610 can be empirically determined. In one or more examples, if the ratio is less than the pre-determined threshold, then in one or more examples, the process can move to step 616 wherein a determination is made that the object is not the same type as the object used to train the classifiers.

In one or more examples, if the ratio is greater than the threshold at step 610, the process 600 can move to step 612 wherein a final check is made to determine if the maximum confidence score at the peak area is a greater than a predetermined threshold which can also be empirically determined. In one or more examples, the final check at step 612 can be optional, and in one or more examples, may not be required to make a determination that the object in the input data object is the same type as the object used to train the classifiers. In one or more examples, if the maximum confidence score in the peak area is greater than a predetermined threshold, then in one or more examples, the process 600 can move to step 614 wherein a final determination is made that the object in the input data object is the same object as that used to train the plurality of binary classifiers.

Figure 7A:
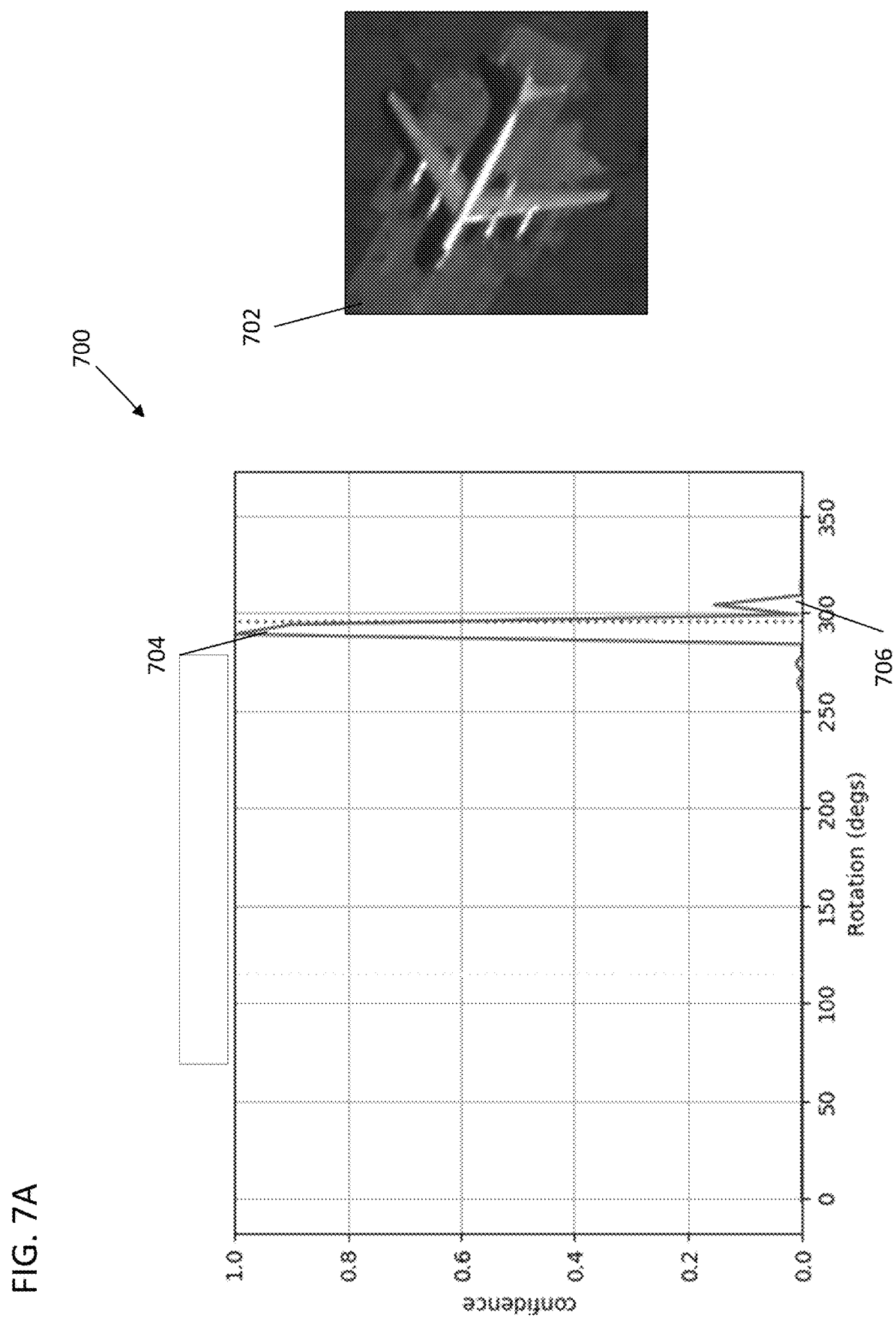
FIGS. 7A-7B illustrate exemplary evaluation data according to examples of the disclosure.
Figure 7B:
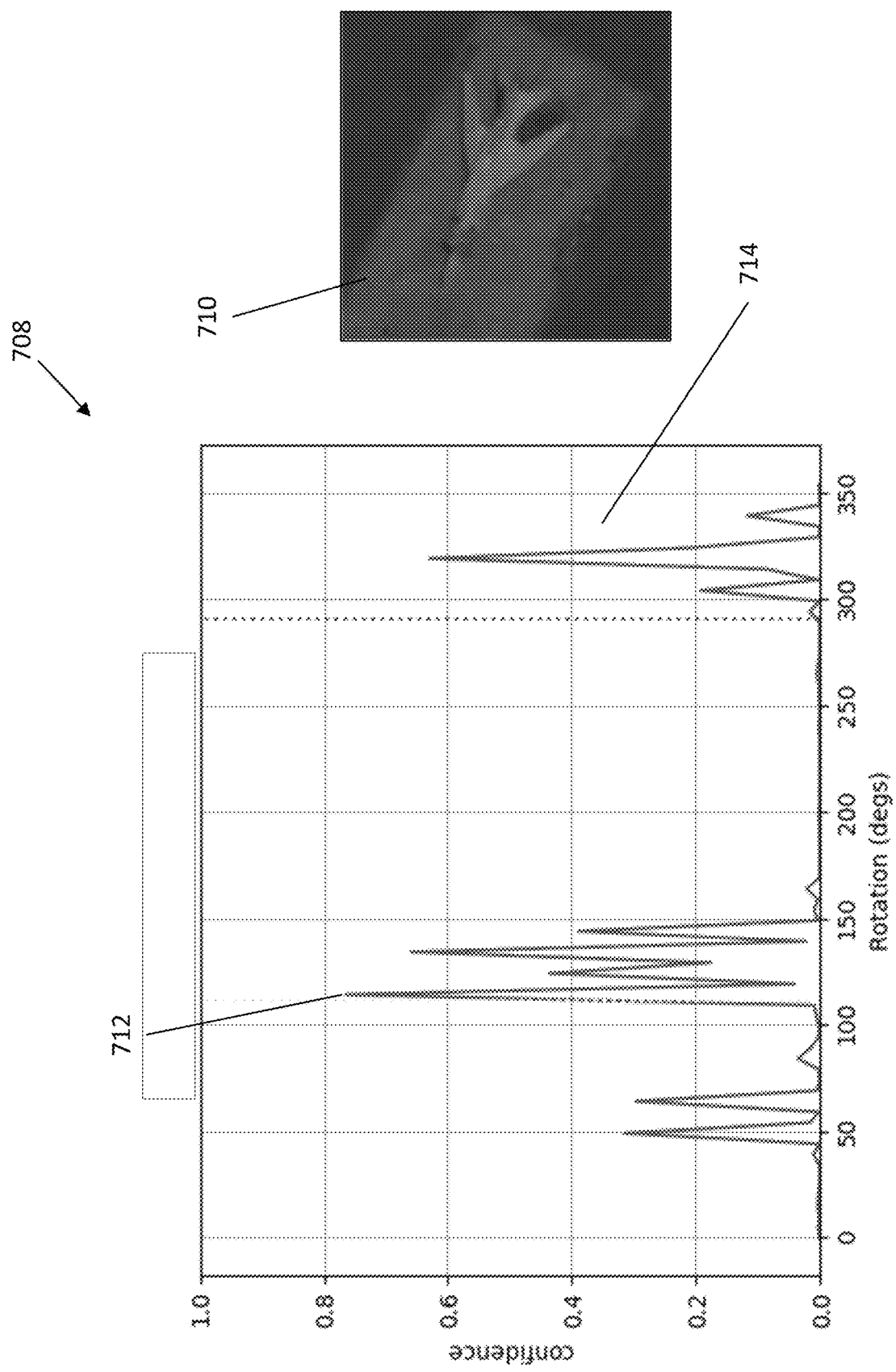

FIGS. 7A-B illustrate exemplary characteristic response curves according to one or more examples of the disclosure. In one or more examples, the response curves of FIGS. 7A-B are based on the example provided above in which image data is analyzed to determine its orientation in the image. In one or more examples, the response curves of FIGS. 7A-B can be created by a system similar to the example of FIG. 3, in which a plurality of binary machine learning classifiers are collectively used to determine the orientation of an aircraft found in an image. In one or more examples, the plurality of binary classifier used to generate the response curves of FIGS. 7A-B have been trained using training data in which a Tu-95 aircraft is depicted in each of the images in the training data. Thus, as described above with respect to FIGS. 6A-6B, since the training data included only Tu-95 aircraft, the set of binary machine learning classifiers can not only be used to determine aircraft orientation, but can also be used to determine whether the aircraft depicted in an evaluation image is a Tu-95 aircraft.

In one or more examples, the response curve 700 of FIG. 7A illustrates a response curve of a Tu-95 image. In one or more examples, the curve 700 can be generated based on the input image 702 which depicts a Tu-95 oriented at roughly a 290° angle. The response curve 700 of FIG. 7A can include a peak area 704 and a non-peak area 706. In one or more examples, because the aircraft used to generate the curve is a Tu-95, which is the same type of aircraft used to train the set of binary machine learning classifiers, the maximum confidence score of the peak area 704 is nearly 1 (indicating a near certainty that the aircraft in image 702 is orientated at roughly) 290°, while the ratio of the peak area 704 to the non-peak area 706 is large.

In contrast, the example response curve 708 of FIG. 7B can be generated with an image 710 which depicts an aircraft that is not a Tu-95, at roughly a 290° orientation. The response curve 708 can include a peak area 712. In one or more examples, the response curve 708 also includes multiple non-peak areas such as the non-peak area 714. In one or more examples, because the aircraft is not the same aircraft used to train the set of binary machine learning classifiers (which was a Tu-95), the ratio of the peak area 712 and the non-peak area 714 is small as compared to the example of FIG. 7A, suggesting that the aircraft depicted in image 710 is not a Tu-95. Furthermore, when compared to the example of FIG. 7A in which the aircraft is a Tu-95, the peak confidence score is smaller (roughly 0.8) and there are multiple non-peak areas whose magnitudes are nearly equal to the peak area. This "noisy" response curve can thus itself act as a classifier, and specifically a binary classifier that indicates whether the aircraft depicted in an evaluation image is that of the same aircraft that was used to train the classifiers.

As illustrated above, decomposing an N-way classification problem into a set of binary machine learning classifiers can not only lead to a less complex system architecture that requires less training data and less time to train, but can also lead to a classifier that can classify object types in the data in addition to classifying characteristics about the objects in the data. While the examples above have been illustrated using an example pertaining to image analysis and specifically determining the orientation of an object depicted in an image data object, the systems and methods described above can be applied to many contexts and thus should not be seen as limited to the contexts provided above.

Figure 8:
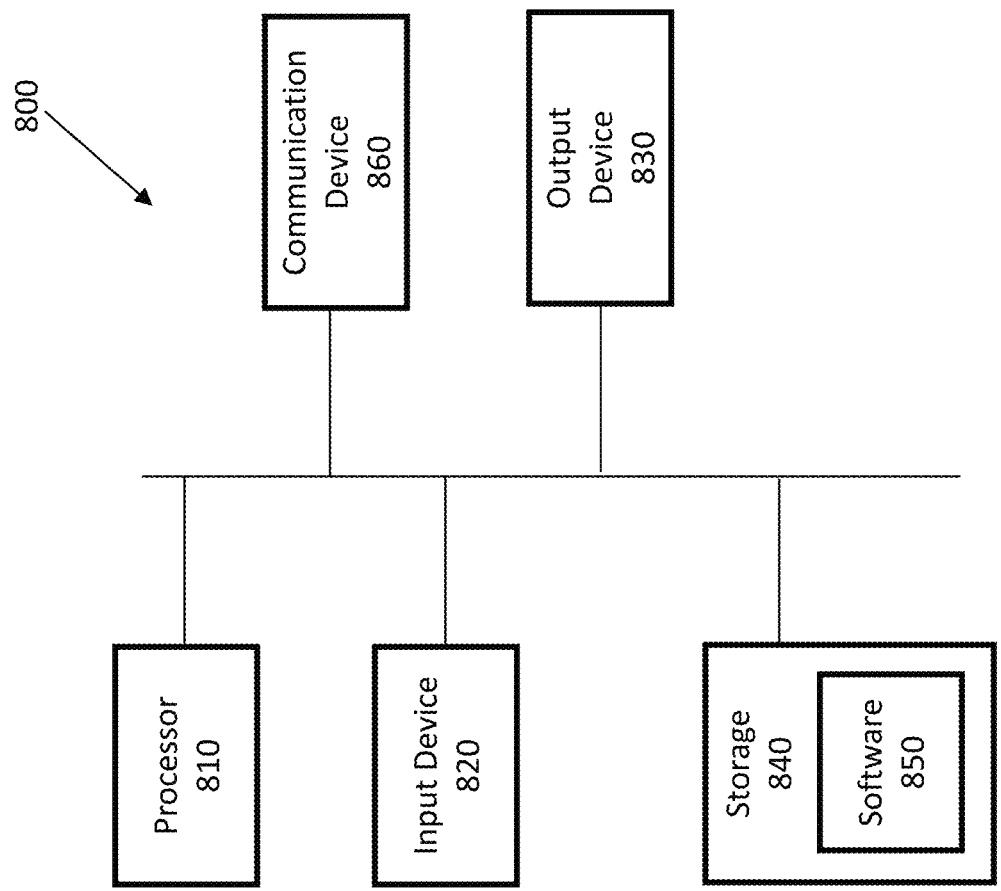
FIG. 8 illustrates an exemplary computing system, according to examples of the disclosure.

FIG. 8 illustrates an example of a computing system 800, in accordance with some examples of the disclosure. System 800 can be a client or a server. As shown in FIG. 8, system 800 can be any suitable type of processor-based system, such as a personal computer, workstation, server, handheld computing device (portable electronic device) such as a phone or tablet, or dedicated device. The system 800 can include, for example, one or more of input device 820, output device 830, one or more processors 810, storage 840, and communication device 860. Input device 820 and output device 830 can generally correspond to those described above and can either be connectable or integrated with the computer.

Input device 820 can be any suitable device that provides input, such as a touch screen, keyboard or keypad, mouse, gesture recognition component of a virtual/augmented reality system, or voice-recognition device. Output device 830 can be or include any suitable device that provides output, such as a display, touch screen, haptics device, virtual/augmented reality display, or speaker.

Storage 840 can be any suitable device that provides storage, such as an electrical, magnetic, or optical memory including a RAM, cache, hard drive, removable storage disk, or other non-transitory computer readable medium. Communication device 860 can include any suitable device capable of transmitting and receiving signals over a network, such as a network interface chip or device. The components of the computing system 800 can be connected in any suitable manner, such as via a physical bus or wirelessly.

Processor(s) 810 can be any suitable processor or combination of processors, including any of, or any combination of, a central processing unit (CPU), field programmable gate array (FPGA), and application-specific integrated circuit (ASIC). Software 850, which can be stored in storage 840 and executed by one or more processors 810, can include, for example, the programming that embodies the functionality or portions of the functionality of the present disclosure (e.g., as embodied in the devices as described above)

Software 850 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 800 can implement any operating system suitable for operating on the network. Software 850 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for determining a characteristic of an object using a plurality of machine learning models, the method comprising:
   receiving an input data object;
   applying a plurality of binary machine learning classifiers for each subrange of a plurality of subranges to the received input object to generate a plurality of confidence scores, wherein each confidence score of the plurality of confidence scores is generated from a binary machine learning classifier of the plurality of machine learning classifiers, wherein the plurality of subranges was determined by dividing a range of a characteristic into the plurality of subranges, and wherein each binary machine learning classifier is configured to generate a confidence score associated with whether an input data object possesses a characteristic value within a subrange of the plurality of subranges that is associated with the binary machine learning classifier;
   generating a characteristic response data set from the generated plurality of confidence scores, wherein generating a characteristic response data set from the generated plurality of confidence scores comprises generating a characteristic response curve, wherein a first dimension of the curve represents the range of the characteristic, wherein a second dimension of the curve represents a probability that the characteristic of the data object is at a particular value;
   determining a value of the characteristic associated with the input data object from the generated characteristic response data set; and
   classifying the object based on the generated characteristic response data set.

2. The method of claim 1, wherein the plurality of binary machine learning classifiers were generated using a supervised training process.

3. The method of claim 2, wherein the supervised training process comprised:
   receiving a plurality of training data objects; and
   annotating each training data object with an indication of whether the data object is within the subrange associated with the binary machine learning classifier undergoing the supervised training process.

4. The method of claim 1, wherein determining the value of the characteristic associated with the input data object comprises determining a maximum of the characteristic response curve.

5. The method of claim 1, wherein classifying the object comprises:
   determining a peak area of the generated response curve; and
   comparing the determined peak area of the generated response curve to a pre-determined threshold.

6. The method of claim 5, wherein determining the peak area of the generated response curve comprises applying a matched filter to the generated response curve.

7. The method of claim 1, wherein classifying the object comprises:
   determining a non-peak area of the generated response curve; and
   comparing a ratio of the determined peak area to the determined non-peak area of the generated response curve, to a pre-determined threshold.

8. The method of claim 7, wherein determining the non-peak area of the generated response curve comprises applying a matched filter to the generated response curve.

9. The method of claim 1, wherein the input data object comprises an image of an aircraft, and wherein the characteristic comprises an orientation of the aircraft in the image.

10. A system for determining a characteristic of an object using a plurality of machine learning models, the system comprising:
   a memory;
   one or more processors;
   wherein the memory stores one or more programs that when executed by the one or more processors, cause the one or more processors to:
   receive an input data object;
   apply a plurality of binary machine learning classifiers for each subrange of a plurality of subranges to the received input object to generate a plurality of confidence scores, wherein each confidence score of the plurality of confidence scores is generated from a binary machine learning classifier of the plurality of machine learning classifiers, wherein the plurality of subranges was determined by dividing a range of a characteristic into the plurality of subranges, and wherein each binary machine learning classifier is configured to generate a confidence score associated with whether an input data object possesses a characteristic value within a subrange of the plurality of subranges that is associated with the binary machine learning classifier;

generate a characteristic response data set from the generated plurality of confidence scores, wherein generating a characteristic response data set from the generated plurality of confidence scores comprises generating a characteristic response curve, wherein a first dimension of the curve represents the range of the characteristic, wherein a second dimension of the curve represents a probability that the characteristic of the data object is at a particular value;

determine a value of the characteristic associated with the input data object from the generated characteristic response data set; and classify the object based on the generated characteristic response data set.

11. The system of claim 10, wherein the plurality of binary machine learning classifiers were generated using a supervised training process.

12. The system of claim 11, wherein the supervised training process comprised:
receiving a plurality of training data objects; and
annotating each training data object with an indication of whether the data object is within the subrange associated with the binary machine learning classifier undergoing the supervised training process.

13. The system of claim 10, wherein determining the value of the characteristic associated with the input data object comprises determining a maximum of the characteristic response curve.

14. The system of claim 10, wherein classifying the object comprises:
determining a peak area of the generated response curve; and
comparing the determined peak area of the generated response curve to a pre-determined threshold.

15. The system of claim 14, wherein determining the peak area of the generated response curve comprises applying a matched filter to the generated response curve.

16. The system of claim 10, wherein classifying the object comprises:
determining a non-peak area of the generated response curve; and
comparing a ratio of the determined peak area to the determined non-peak area of the generated response curve, to a pre-determined threshold.

17. The system of claim 16, wherein determining the non-peak area of the generated response curve comprises applying a matched filter to the generated response curve.

18. The system of claim 10, wherein the input data object comprises an image of an aircraft, and wherein the characteristic comprises an orientation of the aircraft in the image.

19. A non-transitory computer readable storage medium storing one or more programs for determining a characteristic of an object using a plurality of machine learning models, the programs for execution by one or more processors of an electronic device that when executed by the device, cause the device to:
receive an input data object;
apply a plurality of binary machine learning classifiers for each subrange of a plurality of subranges to the received input object to generate a plurality of confidence scores, wherein each confidence score of the plurality of confidence scores is generated from a binary machine learning classifier of the plurality of machine learning classifiers, wherein the plurality of subranges was determined by dividing a range of a characteristic into the plurality of subranges, and wherein each binary machine learning classifier is configured to generate a confidence score associated with whether an input data object possesses a characteristic value within a subrange of the plurality of subranges that is associated with the binary machine learning classifier;

generate a characteristic response data set from the generated plurality of confidence scores, wherein generating a characteristic response data set from the generated plurality of confidence scores comprises generating a characteristic response curve, wherein a first dimension of the curve represents the range of the characteristic, wherein a second dimension of the curve represents a probability that the characteristic of the data object is at a particular value;

determine a value of the characteristic associated with the input data object from the generated characteristic response data set; and classify the object based on the generated characteristic response data set.

20. The non-transitory computer readable storage medium of claim 19, wherein the plurality of binary machine learning classifiers are generated using a supervised training process.

21. The non-transitory computer readable storage medium of claim 20, wherein the supervised training process comprises:
receiving a plurality of training data objects; and
annotating each training data object with an indication of whether the data object is within the subrange associated with the binary machine learning classifier undergoing the supervised training process.

22. The non-transitory computer readable storage medium of claim 19, wherein determining the value of the characteristic associated with the input data object comprises determining a maximum of the characteristic response curve.

23. The non-transitory computer readable storage medium of claim 19, wherein classifying the object comprises:
determining a peak area of the generated response curve; and
comparing the determined peak area of the generated response curve to a pre-determined threshold.

24. The non-transitory computer readable storage medium of claim 23, wherein determining the peak area of the generated response curve comprises applying a matched filter to the generated response curve.

25. The non-transitory computer readable storage medium of claim 19, wherein classifying the object comprises:
determining a non-peak area of the generated response curve; and
comparing a ratio of the determined peak area to the determined non-peak area of the generated response curve, to a pre-determined threshold.

26. The non-transitory computer readable storage medium of claim 25, wherein determining the non-peak area of the generated response curve comprises applying a matched filter to the generated response curve.

27. The non-transitory computer readable storage medium of claim 19, wherein the input data object comprises an image of an aircraft, and wherein the characteristic comprises an orientation of the aircraft in the image.

* * * * *